(12) United States Patent
Marczok et al.

(10) Patent No.: US 8,874,317 B2
(45) Date of Patent: Oct. 28, 2014

(54) PARKING ASSIST SYSTEM

(75) Inventors: Hagen Marczok, Weibersbrunn (DE); Holger Goerg, Haibach (DE); Paolo Di Alberto, Frankfurt am Main (DE)

(73) Assignee: Magna Electronics Inc., Holland, MI (US)

( * ) Notice: Subject to any disclaimer, the term of this patent is extended or adjusted under 35 U.S.C. 154(b) by 219 days.

(21) Appl. No.: 13/384,672

(22) PCT Filed: Jul. 27, 2010
(Under 37 CFR 1.47)

(86) PCT No.: PCT/US2010/043330
§ 371 (c)(1),
(2), (4) Date: Jul. 23, 2012

(87) PCT Pub. No.: WO2011/014482
PCT Pub. Date: Feb. 3, 2011

(65) Prior Publication Data
US 2013/0046441 A1  Feb. 21, 2013

Related U.S. Application Data

(60) Provisional application No. 61/228,655, filed on Jul. 27, 2009.

(51) Int. Cl.
*A01B 69/00* (2006.01)
*B62D 15/02* (2006.01)
*B60Q 9/00* (2006.01)
*B60R 1/00* (2006.01)

(52) U.S. Cl.
CPC ............ *B62D 15/0275* (2013.01); *B60Q 9/005* (2013.01); *B60R 1/00* (2013.01); *B62D 15/028* (2013.01); *B60R 2300/305* (2013.01); *B60R 2300/806* (2013.01); *B60R 2300/8096* (2013.01)

USPC ........................................................... 701/41

(58) Field of Classification Search
None
See application file for complete search history.

(56) References Cited

U.S. PATENT DOCUMENTS 2,632,040 A   3/1953  Rabinow
2,827,594 A   3/1958  Rabinow
(Continued)

FOREIGN PATENT DOCUMENTS

DE       3248511      7/1984
DE     102008049113   5/2009
(Continued)

OTHER PUBLICATIONS

G. Wang, D. Renshaw, P.B. Denyer and M. Lu, CMOS Video Cameras, article, 1991, 4 pages, University of Edinburgh, UK.
(Continued)

*Primary Examiner* — Thomas Tarcza
*Assistant Examiner* — Adam Alharbi
(74) *Attorney, Agent, or Firm* — Gardner, Linn, Burkhart & Flory, LLP

(57) ABSTRACT

In one aspect, the invention is directed to a parking assist system for a vehicle, wherein the parking assist system has two modes of operation. In a first mode a first overlay is added to an image of a rearward field of view displayed to the vehicle driver. The first overlay includes a representation of a target parking position. In a second mode a second overlay is added to the field of view displayed to the vehicle driver. The second overlay includes a representation of a projected path for the vehicle based on a current vehicle steering angle, and a representation of a target path segment for the vehicle.

19 Claims, 12 Drawing Sheets

(56) References Cited

U.S. PATENT DOCUMENTS

| | | |
|---|---|---|
| 3,141,393 A | 7/1964 | Platt |
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |

(56) References Cited

U.S. PATENT DOCUMENTS

| | | |
|---|---|---|
| 5,359,363 A | 10/1994 | Kuban et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,477,464 B2 | 11/2002 | McCarthy et al. |

(56) References Cited

U.S. PATENT DOCUMENTS

| | | |
|---|---|---|
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,940,423 B2* | 9/2005 | Takagi et al. ............... 340/932.2 |
| 6,946,978 B2 | 9/2005 | Schofield |
| 6,947,064 B1* | 9/2005 | Hahn et al. .................... 701/301 |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,295,227 B1* | 11/2007 | Asahi et al. .................... 348/118 |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,366,595 B1* | 4/2008 | Shimizu et al. ............... 701/301 |
| 7,369,940 B2 | 5/2008 | Frank et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,425,076 B2 | 9/2008 | Schofield et al. |
| 7,432,248 B2 | 10/2008 | Roberts et al. |
| 7,459,664 B2 | 12/2008 | Schofield et al. |
| 7,526,103 B2 | 4/2009 | Schofield et al. |
| 7,561,181 B2 | 7/2009 | Schofield et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,680,570 B2 | 3/2010 | Mori |
| 7,720,580 B2 | 5/2010 | Higgins-Luthman |
| 7,914,187 B2 | 3/2011 | Higgins-Luthman et al. |
| 8,285,479 B2* | 10/2012 | Kawabata et al. ............ 701/301 |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0080877 A1* | 5/2003 | Takagi et al. ............... 340/932.2 |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0130464 A1 | 7/2004 | Schindler et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2005/0285758 A1* | 12/2005 | Matsukawa et al. ........ 340/932.2 |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Widmann et al. |
| 2006/0287825 A1* | 12/2006 | Shimizu et al. ............... 701/216 |
| 2006/0287826 A1* | 12/2006 | Shimizu et al. ............... 701/216 |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0180529 A1 | 7/2008 | Taylor et al. |
| 2009/0113509 A1 | 4/2009 | Tseng et al. |
| 2010/0045797 A1 | 2/2010 | Schofield et al. |
| 2010/0235053 A1* | 9/2010 | Iwakiri et al. .................... 701/42 |
| 2010/0286872 A1* | 11/2010 | Endo et al. ....................... 701/41 |
| 2013/0046441 A1* | 2/2013 | Marczok et al. ................. 701/41 |

FOREIGN PATENT DOCUMENTS

| | | |
|---|---|---|
| EP | 0513476 | 11/1992 |
| EP | 1950097 | 7/2008 |

(56) References Cited

FOREIGN PATENT DOCUMENTS

| | | |
|---|---|---|
| FR | 2585991 | 2/1987 |
| FR | 2672857 | 8/1992 |
| FR | 2673499 | 9/1992 |
| GB | 934037 | 8/1963 |
| GB | 2137573 | 10/1984 |
| GB | 2244187 | 11/1991 |
| GB | 2255539 | 11/1992 |
| JP | 55039843 | 3/1980 |
| JP | 58110334 | 6/1983 |
| JP | 58209635 | 12/1983 |
| JP | 59114139 | 7/1984 |
| JP | 5913336 | 9/1984 |
| JP | 6080953 | 5/1985 |
| JP | 60261275 | 11/1985 |
| JP | 6079889 | 10/1986 |
| JP | 62122487 | 6/1987 |
| JP | 62122844 | 6/1987 |
| JP | 6272245 | 8/1987 |
| JP | 6414700 | 1/1989 |
| JP | 01123587 | 5/1989 |
| JP | 30061192 | 3/1991 |
| JP | 4114587 | 4/1992 |
| JP | 40245886 | 9/1992 |
| JP | 50000638 | 1/1993 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | 2630604 | 4/1997 |
| WO | WO 9621581 | 7/1996 |

OTHER PUBLICATIONS

Tokimaru et al., "CMOS Rear-View TV System with CCD Camera", National Technical Report vol. 34, No. 3, pp. 329-336, Jun. 1988 (Japan).
International Search Report dated Sep. 16, 2010 from corresponding PCT application No. PCT/US2010/04440.
Reexamination Control No. 90/007,519, dated Jun. 9, 2005, Reexamination of U.S. Patent No. 6,222,447, issued to Schofield et al.
Reexamination Control No. 90/007,520, dated Jun. 9, 2005, Reexamination of U.S. Patent No. 5,949,331, issued to Schofield et al.
Reexamination Control No. 90/011,478, dated Mar. 28, 2011, Reexamination of U.S. Patent No. 6,222,447, issued to Schofield et al.
Reexamination Control No. 90/011,477, dated Mar. 14, 2011, Reexamination of U.S. Patent No. 5,949,331, issued to Schofield et al.
EP Supplementary Search Report for EP Application No. EP10804947, dated Mar. 22, 2013.

* cited by examiner

US 8,874,317 B2

PARKING ASSIST SYSTEM

CROSS REFERENCE TO RELATED APPLICATIONS

The present application is a 371 national phase filing of PCT Application No. PCT/US2010/043330, filed Jul. 27, 2010, which claims the filing benefit of U.S. provisional application Ser. No. 61/228,655, filed Jul. 27, 2009, which are hereby incorporated herein by reference in their entireties.

FIELD OF THE INVENTION

The present invention relates to a parking assist system for use in vehicles.

BACKGROUND OF THE INVENTION

Parking assist systems are currently available only on certain luxury vehicles, and are typically relatively complex systems that are either entirely or semi-autonomous, capable of steering and/or driving the vehicle into a parking spot. Such systems typically require significant processing power in order to determine a suitable path to follow during the parking maneuver. Such systems can be relatively expensive.

It would be advantageous if a parking assist system were available that required relatively less processing power, that was relatively simpler, and was relatively less expensive than some systems of the prior art.

SUMMARY OF THE INVENTION

In a first aspect, the invention is directed to a parking assist system for a vehicle, wherein a target parking position overlay is added to an image of a field of view of the camera displayed to the vehicle driver.

In a particular embodiment of the first aspect, the parking assist system includes a camera mounted to the vehicle and having a rearward field of view, a display in the vehicle connected to the camera and configured to display an image of the field of view, and a controller configured to add an overlay to the image of the field of view. The overlay includes a representation of a target parking position.

In a second aspect, the invention is directed to a parking assist system for a vehicle, that is configured to:
select a target path for the vehicle driver to follow while parking the vehicle,
to inform the driver of the vehicle's projected path based on the vehicle's steering angle,
and to inform the driver of whether the projected path matches the target path.

In a particular embodiment of the second aspect, the parking assist system includes a camera mounted to the vehicle and having a rearward field of view, a display in the vehicle connected to the camera and configured to display an image of the field of view, and a controller configured to add an overlay to the image of the field of view. The overlay includes a representation of a projected path for the vehicle based on a current vehicle steering angle, and a representation of a target path for the vehicle.

In a third aspect, the invention is directed to a parking assist system for a vehicle, wherein the parking assist system has two modes of operation. In a first mode a first overlay is added to an image of a rearward field of view of the camera displayed to the vehicle driver. The first overlay includes a representation of a target parking position. In a second mode a second overlay is added to the field of view displayed to the vehicle driver. The second overlay includes a representation of a projected path for the vehicle based on a current vehicle steering angle, and a representation of a target path segment for the vehicle.

In a particular embodiment of the third aspect, the parking assist system includes a camera mounted to the vehicle and having a rearward field of view, a display in the vehicle connected to the camera and configured to display an image of the field of view, and a controller configured to operate the parking assist system in two operating modes. In a first operating mode the controller is configured to add a first overlay to the image of the field of view, wherein the first overlay includes a representation of a target parking position. In a second operating mode the controller is configured to add a second overlay to the image of the field of view, wherein the second overlay includes a representation of a projected path for the vehicle based on a current vehicle steering angle, and a representation of a target path segment for the vehicle.

In a fourth aspect, the invention is directed to a parking assist system for a vehicle, wherein the parking assist system selects a plurality of target path segments for the vehicle to follow to park in a target parking spot, wherein each target path segment involves the vehicle having steering wheels pointed straight or at full lock.

In a particular embodiment of the fourth aspect, the parking assist system includes a camera mounted to the vehicle and having a rearward field of view, a display in the vehicle connected to the camera and configured to display an image of the field of view, and a controller configured to select a plurality of target path segments for the vehicle to follow to park in a target parking spot. Each target path segment involves the vehicle having the steering wheels pointed straight or at full lock.

BRIEF DESCRIPTION OF THE DRAWINGS

The present invention will now be described by way of example only with reference to the attached drawings, in which.

DETAILED DESCRIPTION OF THE INVENTION

Figure 1:
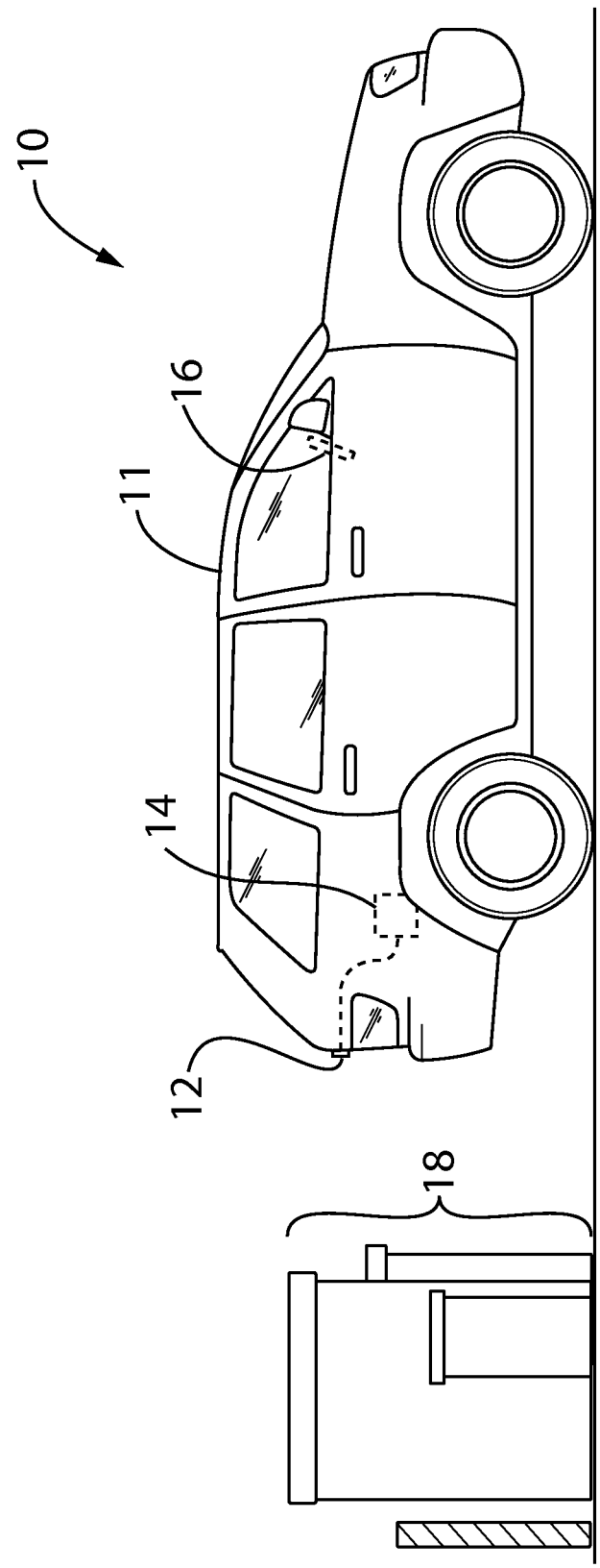
FIG. 1 is a schematic illustration of a parking assist system in accordance with an embodiment of the present invention.
Figure 2:
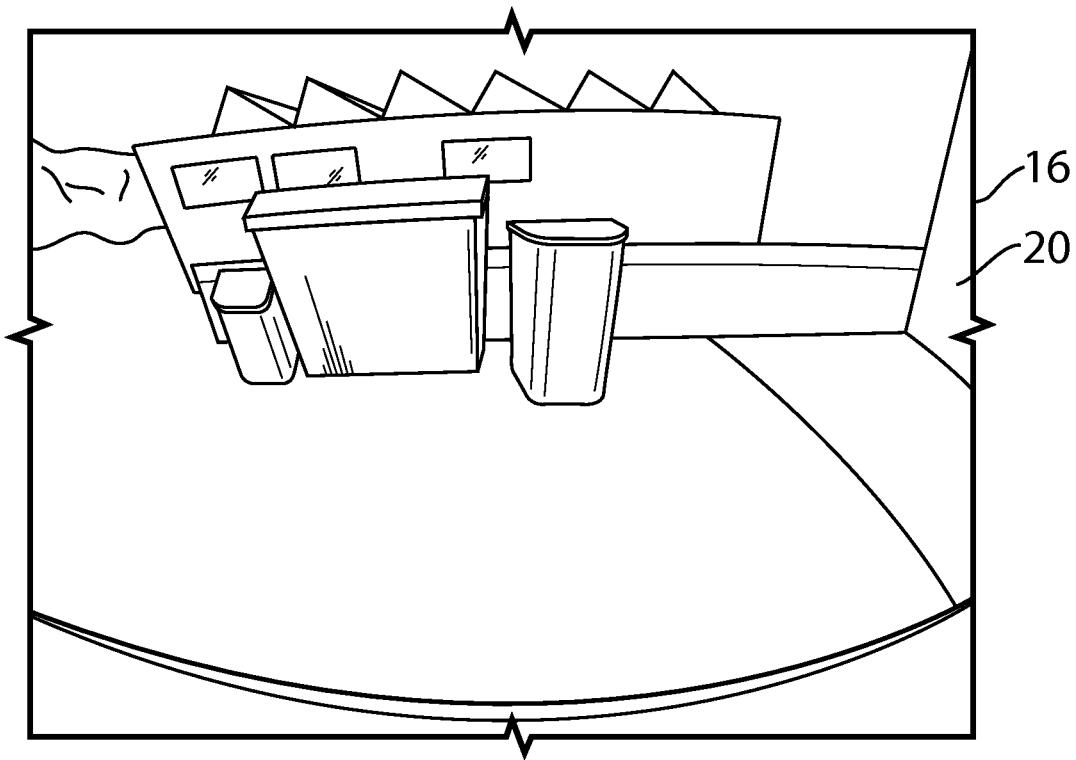
FIG. 2 is a view of an image of a field of view of the camera on a display that is part of the parking assist system shown in FIG. 1.

Reference is made to FIG. 1, which shows a parking assist system 10 for use in a vehicle 11, in accordance with an embodiment of the present invention. The parking assist system includes a camera 12, a controller 14 and a display 16. The camera 12 is positioned on the vehicle 11 for rearward viewing and has a field of view generally shown at 18. The controller 14 communicates with the camera 12 and sends an image 20 of the field of view 18 (FIG. 2) to the display 16, which is positioned in the vehicle cabin. The display 16 is positioned to display the image 20 of the field of view 18 to the vehicle driver.

Figure 3:
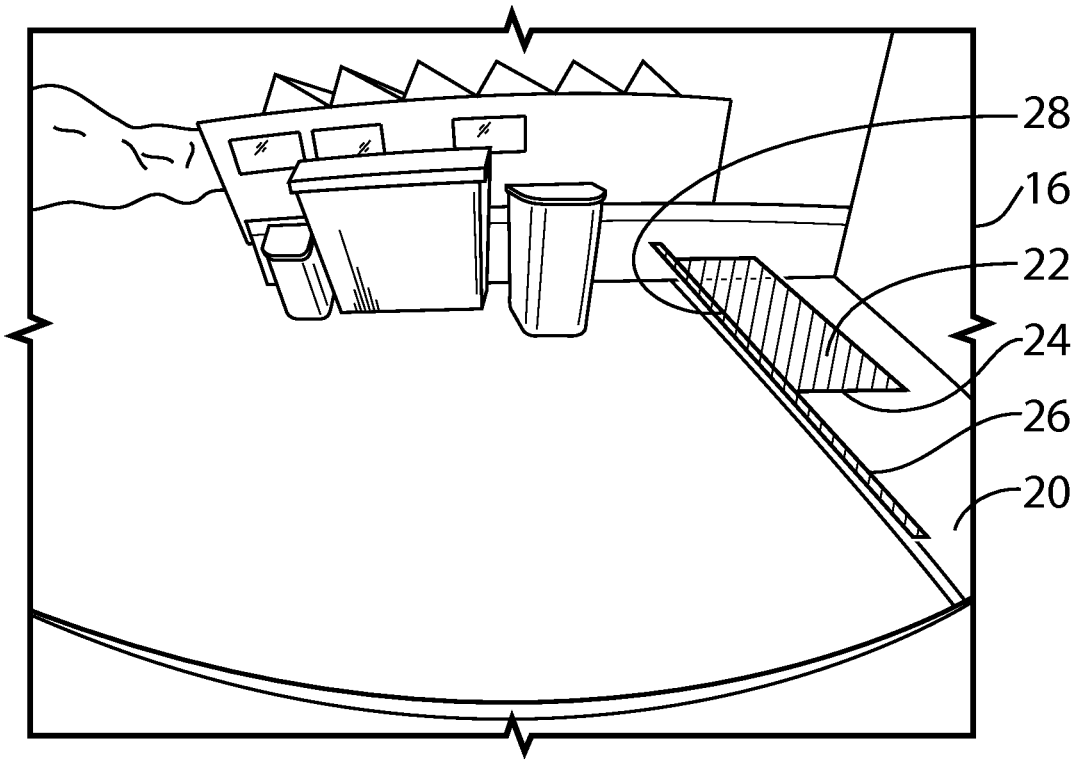
FIG. 3 is a view of an image of a field of view of the camera on the display shown in FIG. 3, with the parking assist system in a parking spot locator mode.

When the vehicle driver wants to use the parking assist system 10 (FIG. 1), he or she presses a button in the interior of the vehicle 11, which activates the parking assist system 10 in a first mode, which is a parking spot locator mode. When in the parking spot locator mode, the controller 14 adds an overlay 22 (FIG. 3) to the image 20, which assists the driver in finding a suitable parking spot for the vehicle 11 (FIG. 1). The overlay 22 (FIG. 3) includes a rectangle 24 which is a representation of a target parked position which is offset a selected distance behind and a selected distance laterally from the vehicle 11 (FIG. 1). The size of the rectangle 24 (FIG. 3) preferably represents substantially the length and further preferably represents substantially the width of the vehicle 11 (FIG. 1).

The overlay 22 (FIG. 3) also includes a line 26 extending along the outside edge (shown at 28) of the rectangle 24 (ie. the side edge of the rectangle 24 that faces outwardly from the parking spot).

The line 26 extends a selected distance forward of the rectangle 24 and a selected distance rearward of the rectangle 24 and assists the driver of the vehicle 11 in lining up the vehicle 11 to be parallel to the parking lane.

Figure 4:
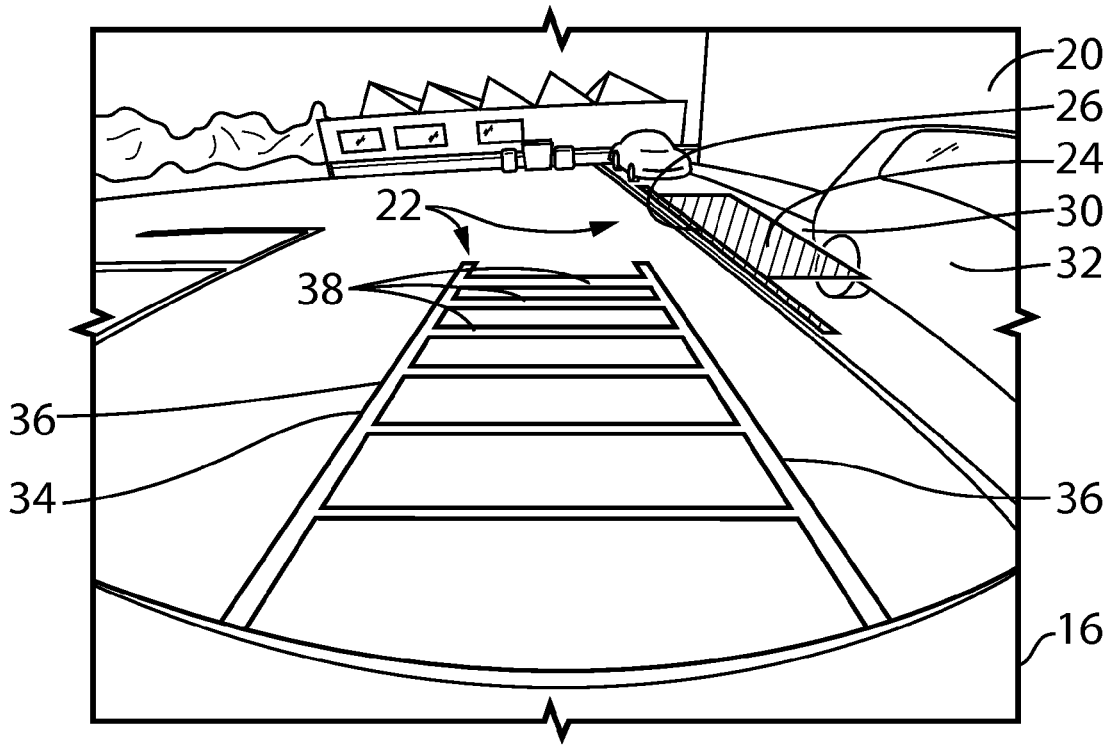
FIG. 4 is a view of an image of a field of view of the camera on the display shown in FIG. 3, with the parking assist system in the parking spot locator mode, after the vehicle has traveled past a target parking spot.

With the overlay 22 shown on the image 20, the driver drives along the road until he or she finds a potential parking spot, shown at 30 in FIG. 4. In the exemplary embodiment shown in the figures, the driver drove forward to find the potential parking spot 30. As shown in FIG. 4, the vehicle 11 has overshot the potential parking spot 30 and so the forward edge of the rectangle 24 is too far forward, overlapping with the vehicle (shown at 32) that is forward of the potential parking spot 30. Having driven too far forward, the driver may put vehicle 11 (FIG. 1) into reverse gear in order to back up to superimpose the rectangle 24 on the potential parking spot 30.

When the vehicle is in reverse, a representation 34 of the projected path of the vehicle is added to the included in the overlay 22 that is provided with the image 20 shown on the display 16. The representation 34 is based on the steering angle of the vehicle and is updated as the steering angle changes.

The representation 34 includes several features such as lateral edge lines 36 and distance markers 38. The lateral edge lines 36 correspond to the lateral edges of the vehicle. The distance markers 38 each correspond to a selected distance behind the vehicle, preferably in uniform increments.

Figure 5:
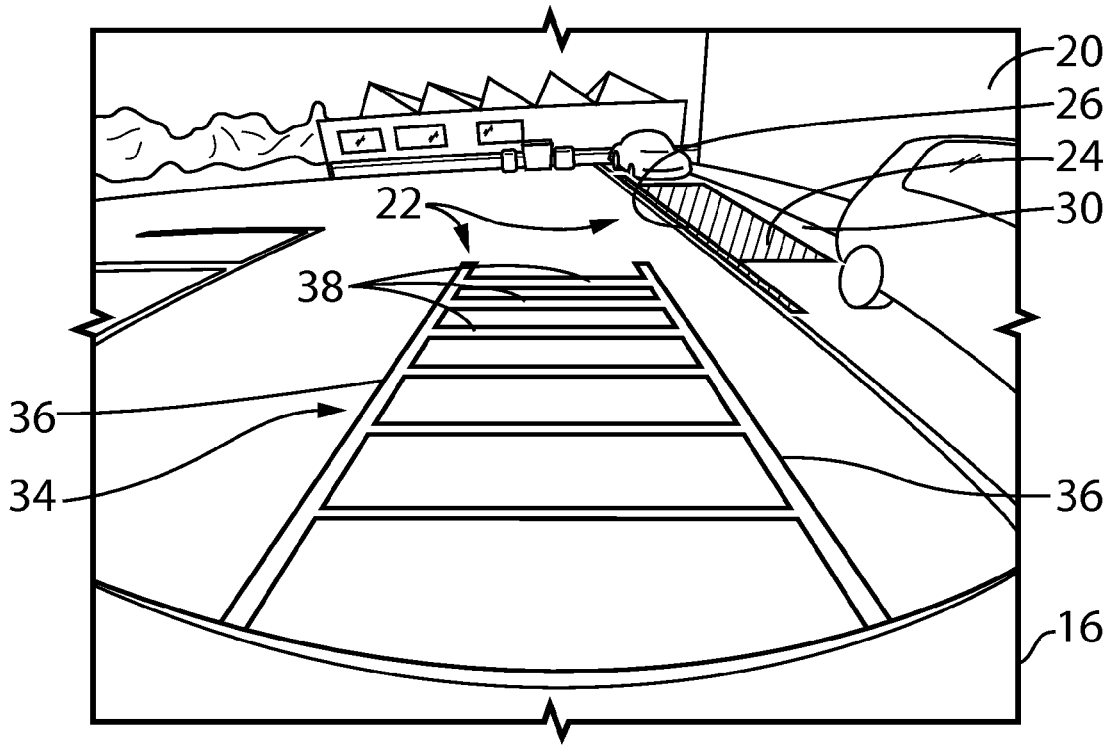
FIG. 5 is a view of an image of a field of view on the display shown in FIG. 3, with the parking assist system in the parking spot locator mode, after the vehicle has backed up to a suitable position to park in the target parking spot.

As shown in FIG. 5, the vehicle 11 (FIG. 1) has backed up sufficiently to superimpose the rectangle 24 on the potential parking spot 30. Once in this position, the driver can see that the vehicle 11 (FIG. 1) has sufficient room to fit in the parking spot 30. It is optionally possible for the length of the rectangle 24 to be the length required by the vehicle to fit in the parking spot instead of simply representing the length of the vehicle 11 (FIG. 1) itself. As will be understood by one skilled in the art, the length required by the vehicle (FIG. 1) to park in a spot is some amount longer than the length of the vehicle (FIG. 1) itself.

Figure 6:
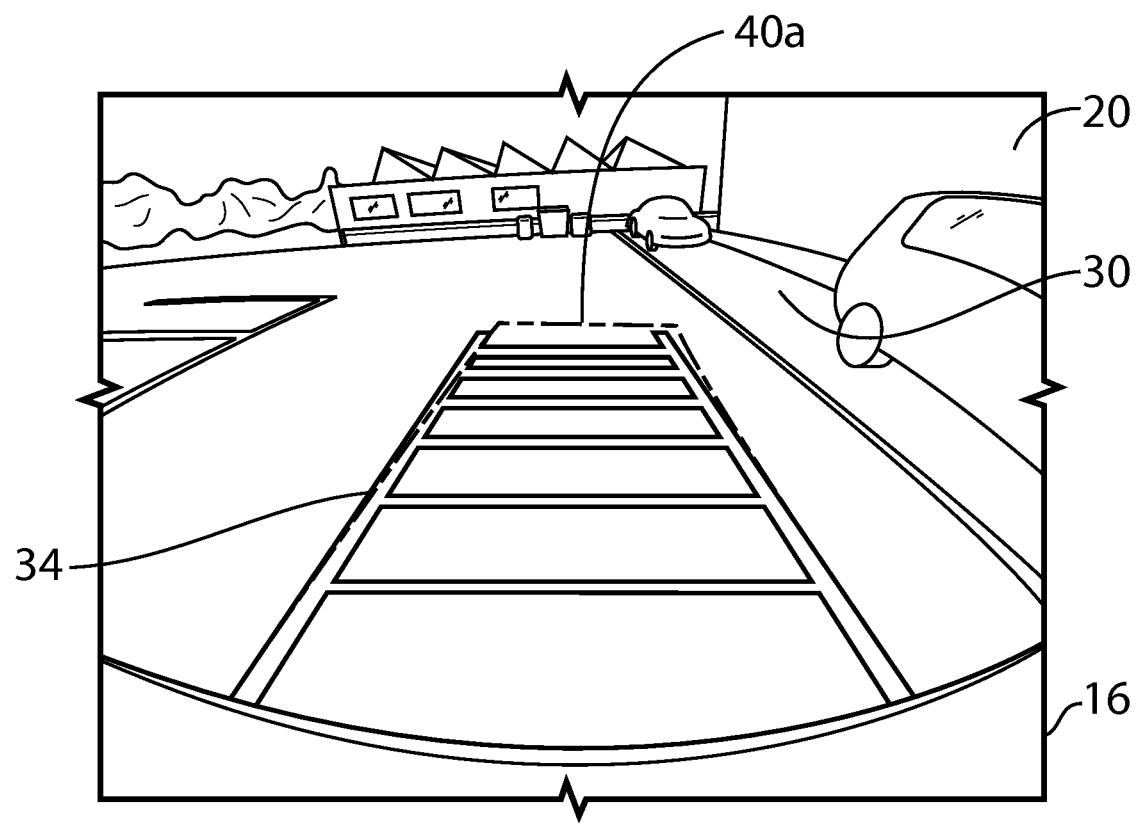
FIG. 6 is a view of an image of a field of view on the display shown in FIG. 3, with the parking assist system in a parking guidance mode, showing the alignment between the projected path of the vehicle with a first target path segment for the vehicle.
Figure 7A:
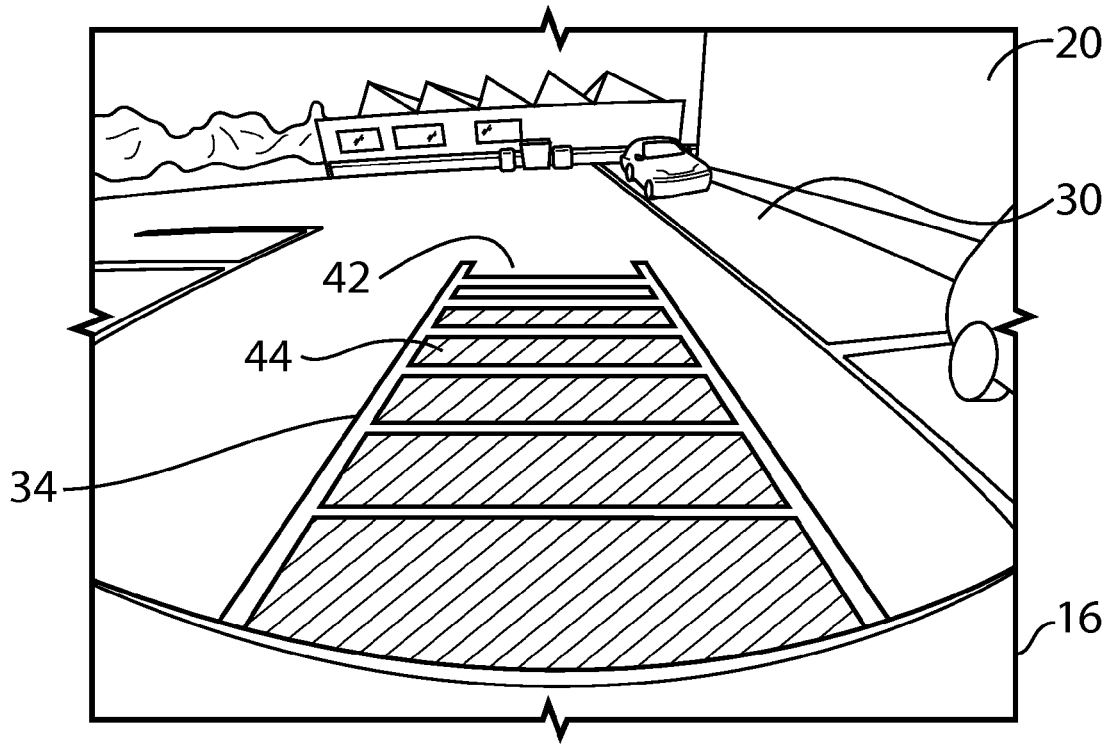
FIGS. 7a-7d are views of an image of a field of view on the display shown in FIG. 3, with the parking assist system in the parking guidance mode, illustrating the progression of the vehicle along the first target path segment.
Figure 7B:
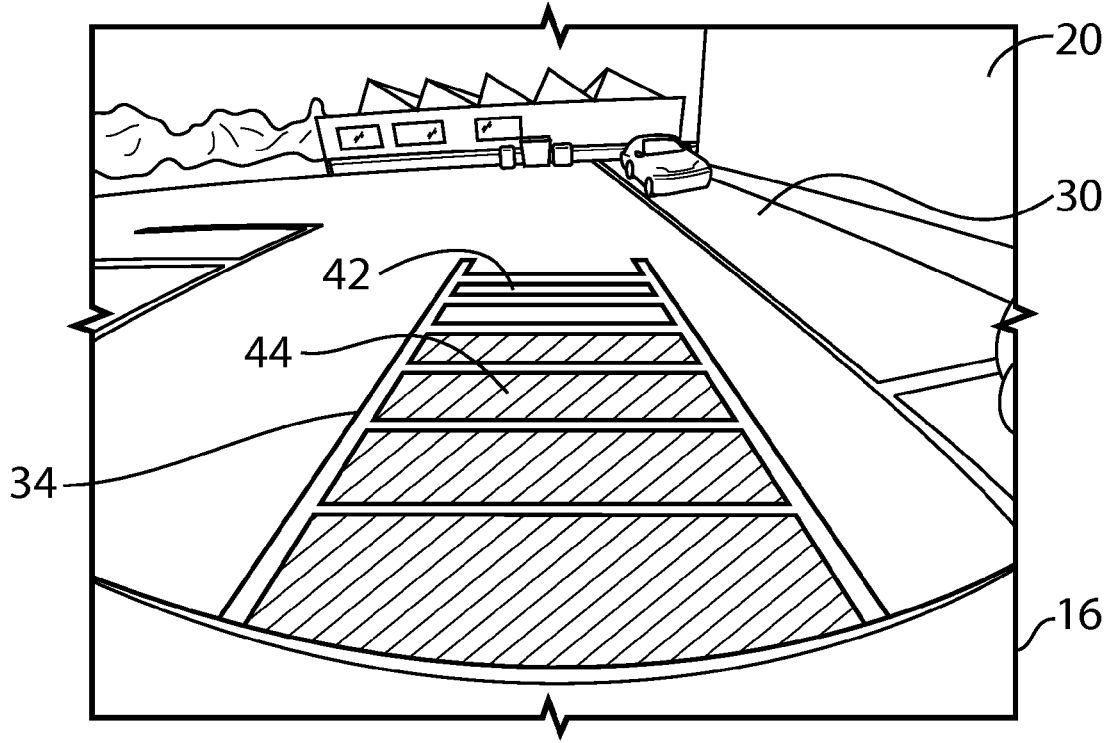
Figure 7C:
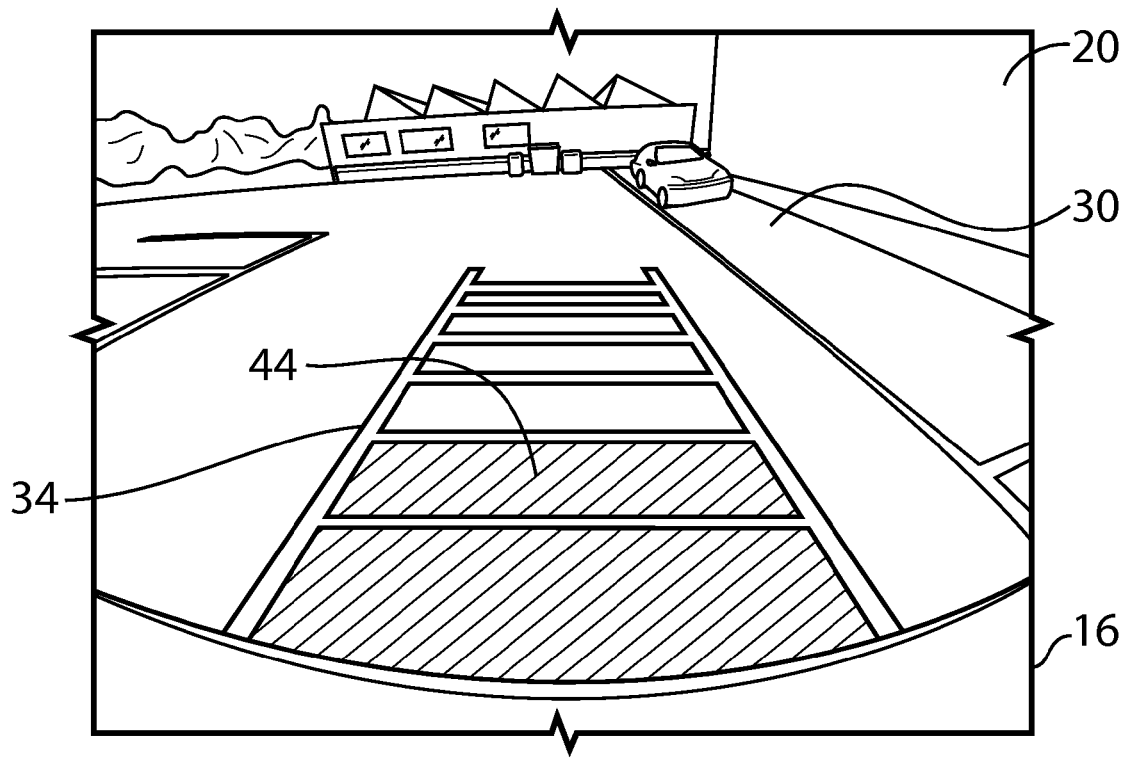
Figure 7D:
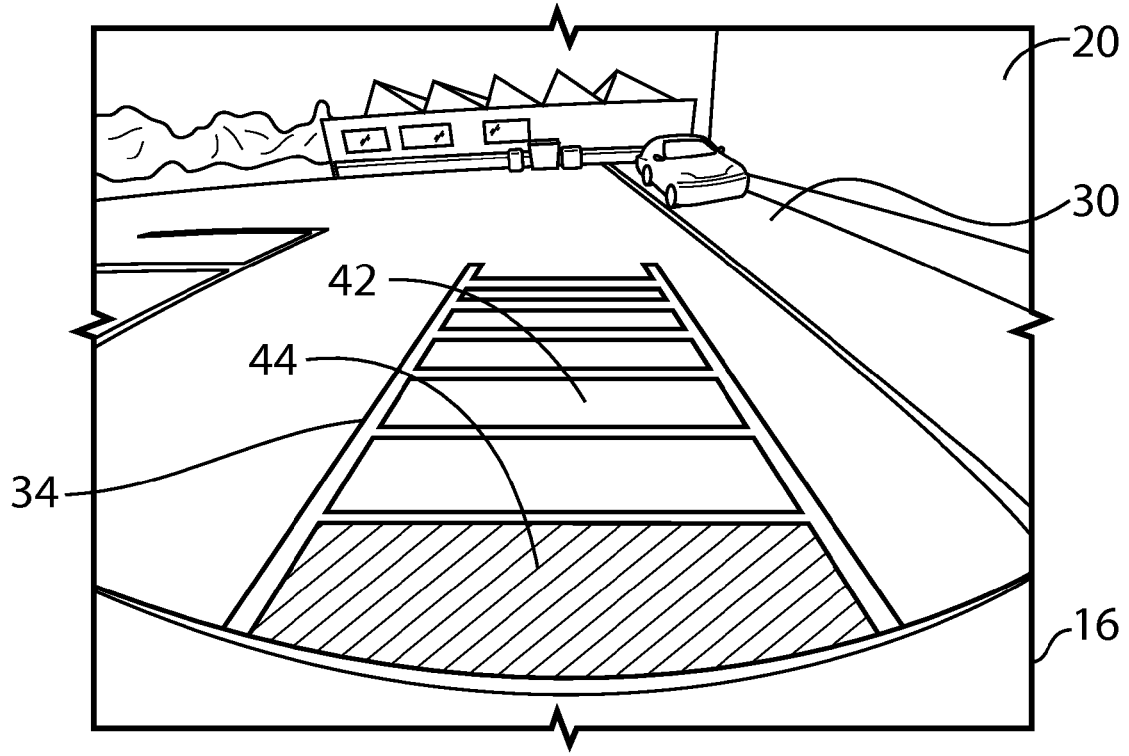

Once the driver has decided that the parking spot 30 (FIG. 5) is suitable, he or she may press another button on the dashboard to activate the parking assist system 10 (FIG. 1) in a parking guidance mode, as shown in FIG. 6.

In the parking guidance mode, the parking assist system 10 (FIG. 1) determines a target path for the vehicle 11 to follow in order to park in the spot delineated by the rectangle 24 (FIG. 6) at the time that the parking guidance mode was initiated.

When in the parking guidance mode, two representations are shown on the display 16. One is the aforementioned representation 34 of the vehicle's projected path at the current steering angle. The other is a representation shown at 40a of a segment of the target path to reach the parking spot delineated by the rectangle 24 (FIG. 5).

Initially, the driver turns the vehicle's steering wheel until the projected path representation 34 of the vehicle substantially aligns with the target path segment representation 40a. When they are suitably aligned, the parking assist system 10 may notify the driver that he/she can proceed to back the vehicle up along the target path. Alternatively, the alignment of the representations 34 and 40a visually on the display 16 may itself be considered notification to the driver that the projected path suitably matches the target path.

Referring to FIGS. 7a, 7b, 7c and 7d, as the driver backs the vehicle up progressively along the target path segment, a distal portion 42 of the target path representation 40a change from one colour to another, shortening the length of the proximal portion 44 of the representation 40a that remains in the first colour. This gives the driver an indication of how much of the target path segment remains to be driven before another phase of the parking maneuver is to be made.

Figure 8A:
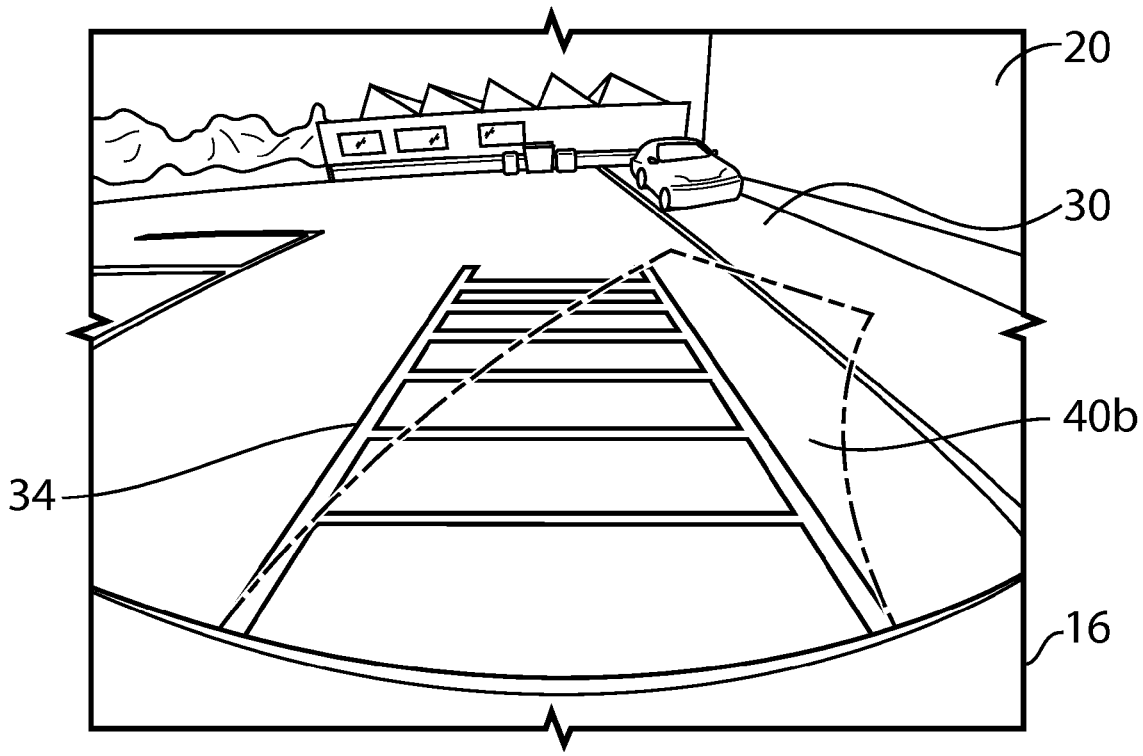
FIGS. 8a-8c are views of an image of a field of view on the display shown in FIG. 3, with the parking assist system in the parking guidance mode, showing the progression towards alignment between the projected path of the vehicle with a second target path segment for the vehicle.

Once the vehicle has driven the entire target path segment, the parking assist system 10 selects the next segment of the target path for the vehicle to follow, and represents it on the display 16 as the representation 40b shown in FIG. 8a. The second target path segment representation 40b guides the driver in the turn-in phase of the parking maneuver. At the point in time shown in FIG. 8a, the vehicle's steering wheels are still pointed straight since the first target path segment which was just completed was a straight segment. Thus, at the point in time shown in FIG. 8a, the driver's projected path represented at 34 is misaligned with the second target path segment represented at 40b.

Figure 8B:
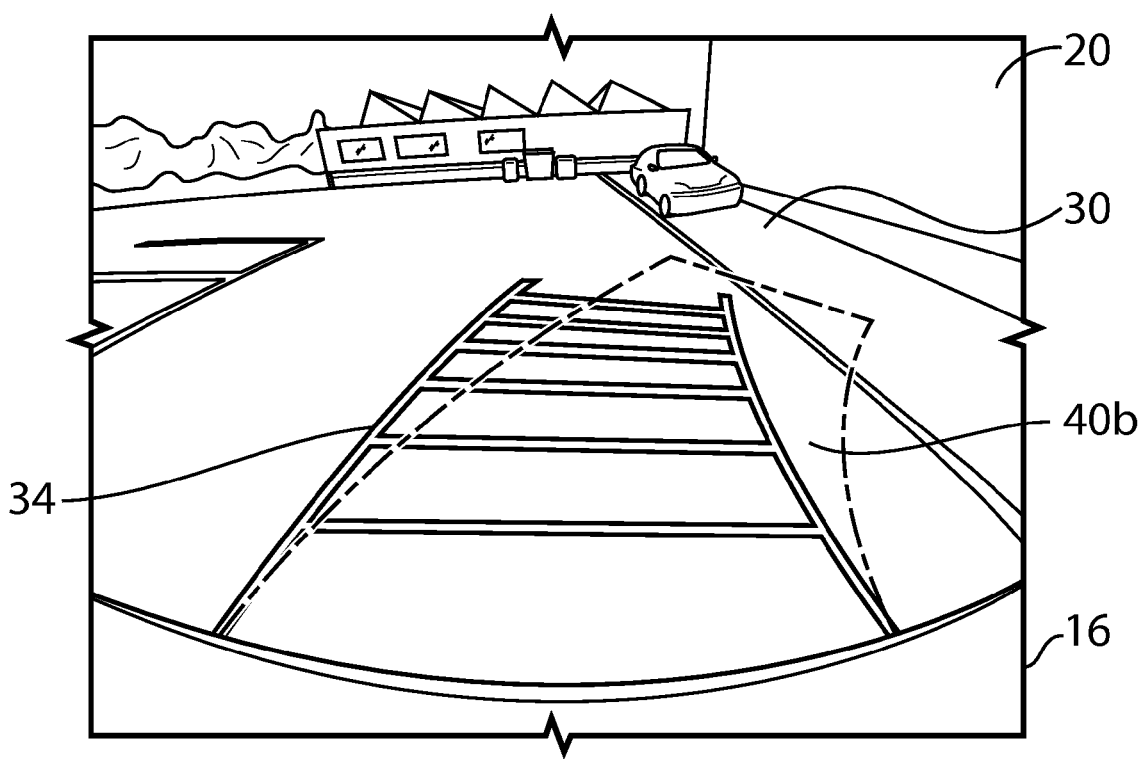
Figure 8C:
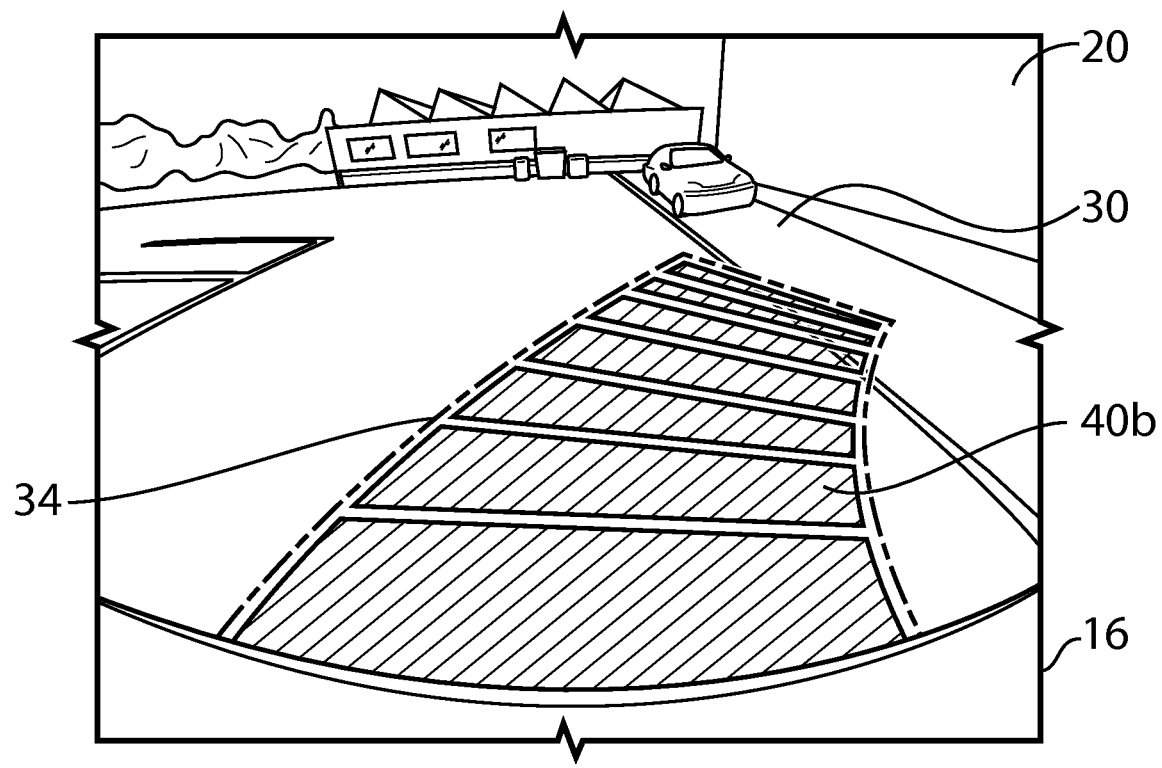

As the driver turns the steering wheel to align the vehicle's projected path with the target path segment, the projected path representation 34 becomes progressively aligned with and superimposed with the target path segment representation 40b, as shown in FIG. 8b. After the driver turns the steering wheel sufficiently, the vehicle's projected path is aligned with the vehicle's target path segment, as shown by the representations 34 and 40b in FIG. 8c. The target path segment illustrated in FIGS. 8a, 8b and 8c may be the path at full wheel lock (ie. at the maximum steering angle the vehicle is capable of).

Figure 9A:
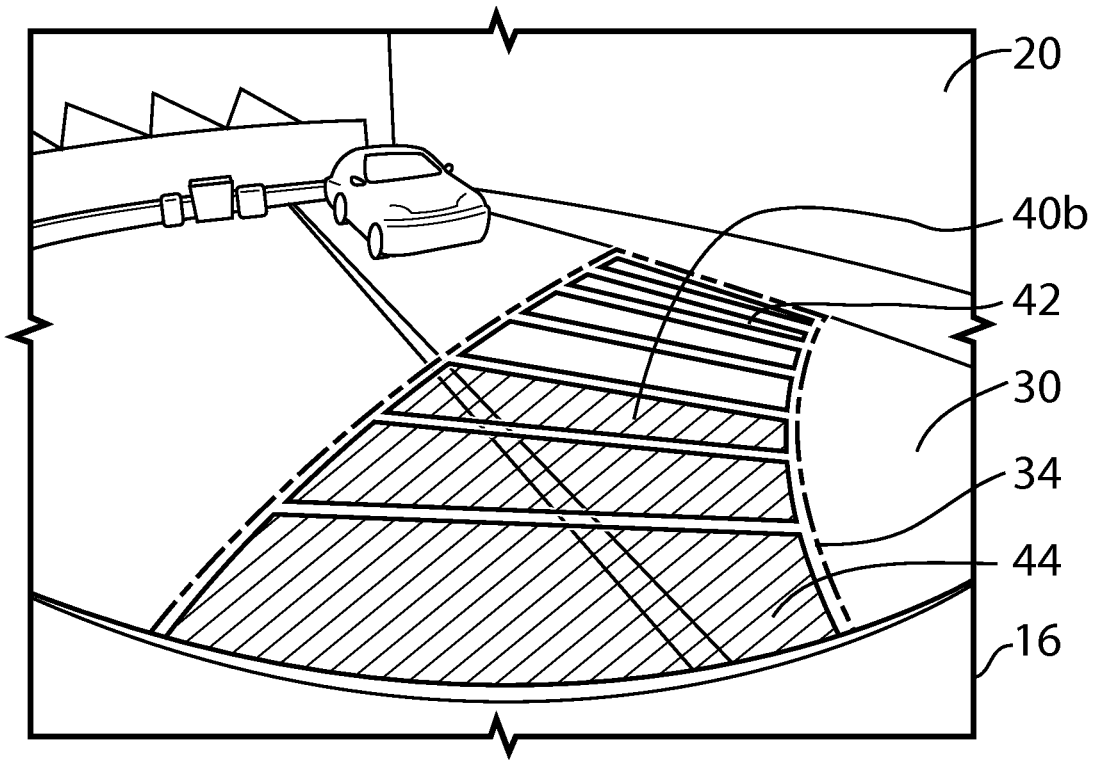
FIGS. 9a and 9b are views of an image of a field of view on the display shown in FIG. 3, with the parking assist system in the parking guidance mode, illustrating the progression of the vehicle along the second target path segment.
Figure 9B:
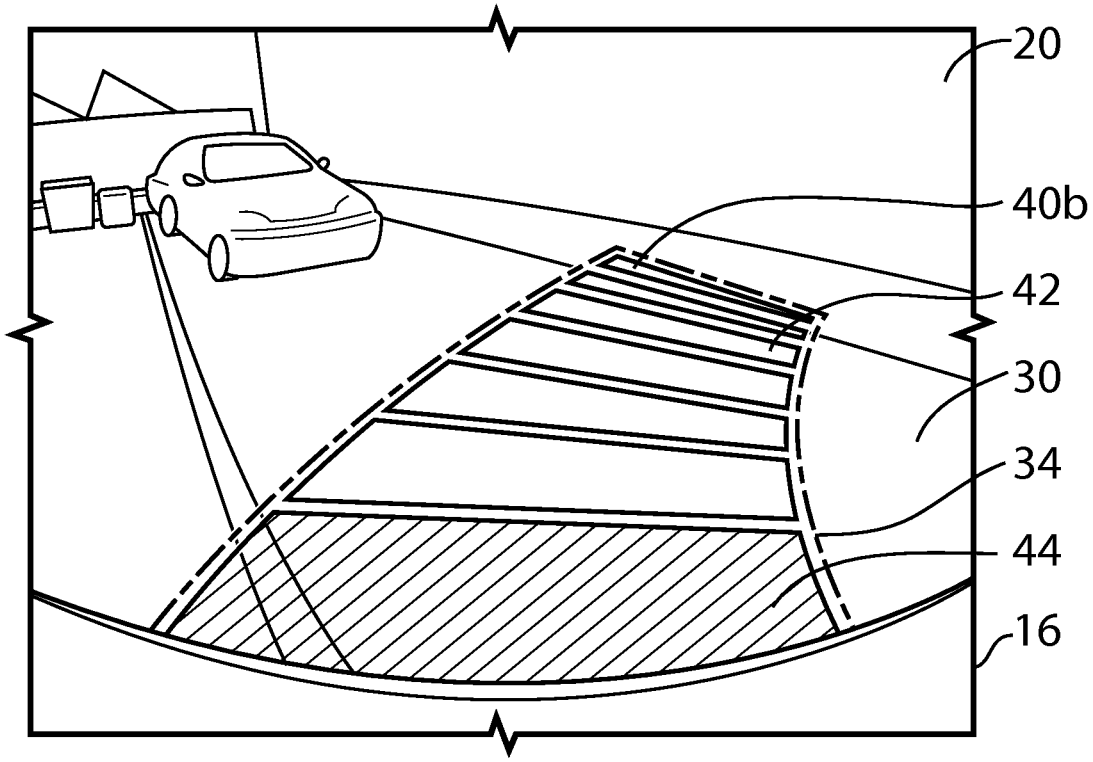
Figure 10A:
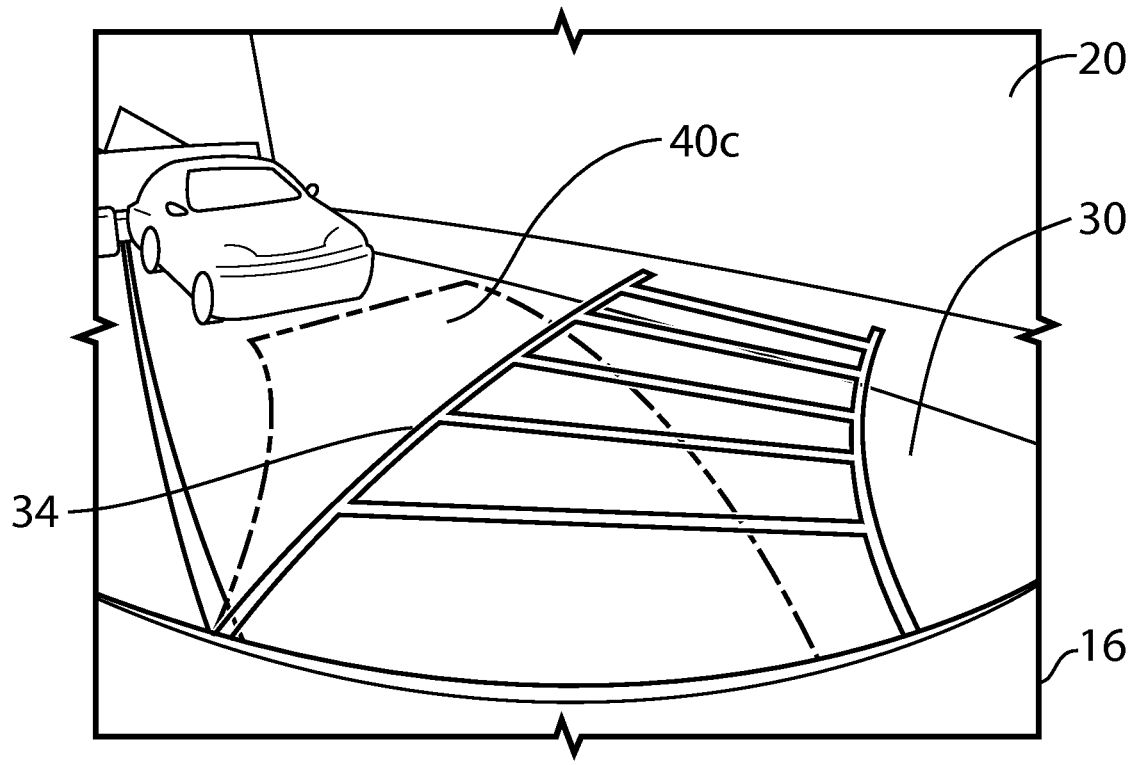
FIGS. 10a-10d are views of an image of a field of view on the display shown in FIG. 3, with the parking assist system in the parking guidance mode, showing the progression towards alignment between the projected path of the vehicle with a third target path segment for the vehicle.
Figure 10B:
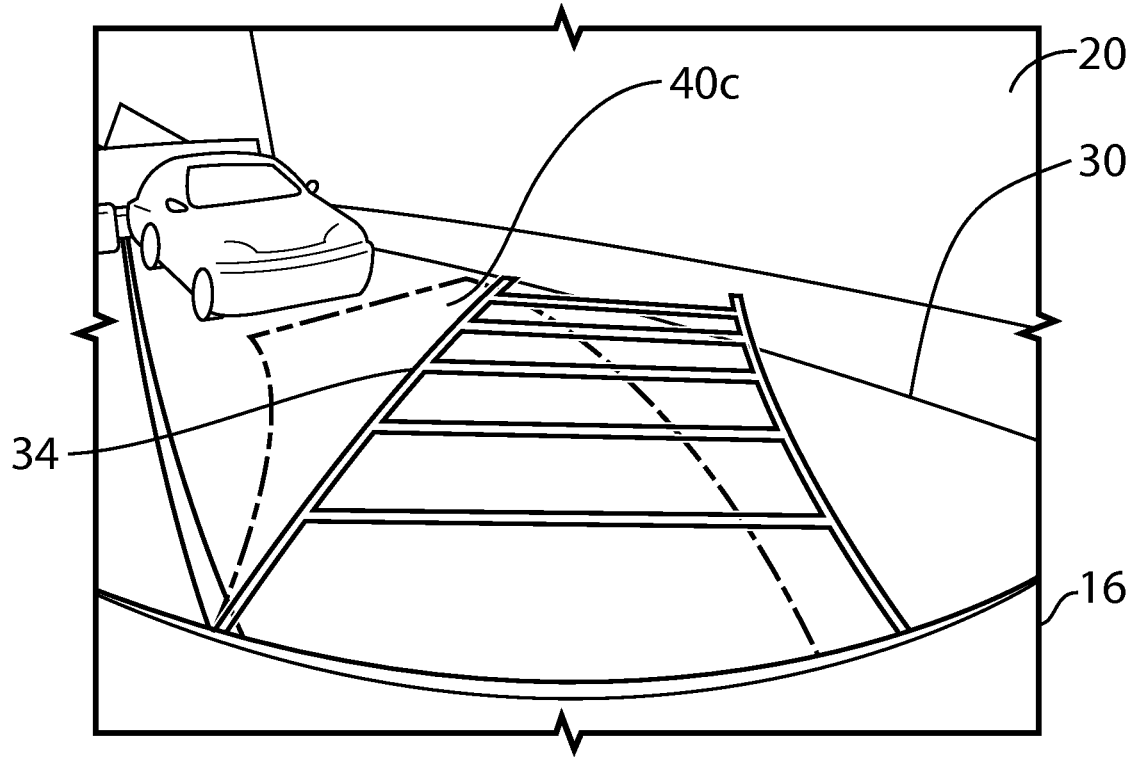
Figure 10C:
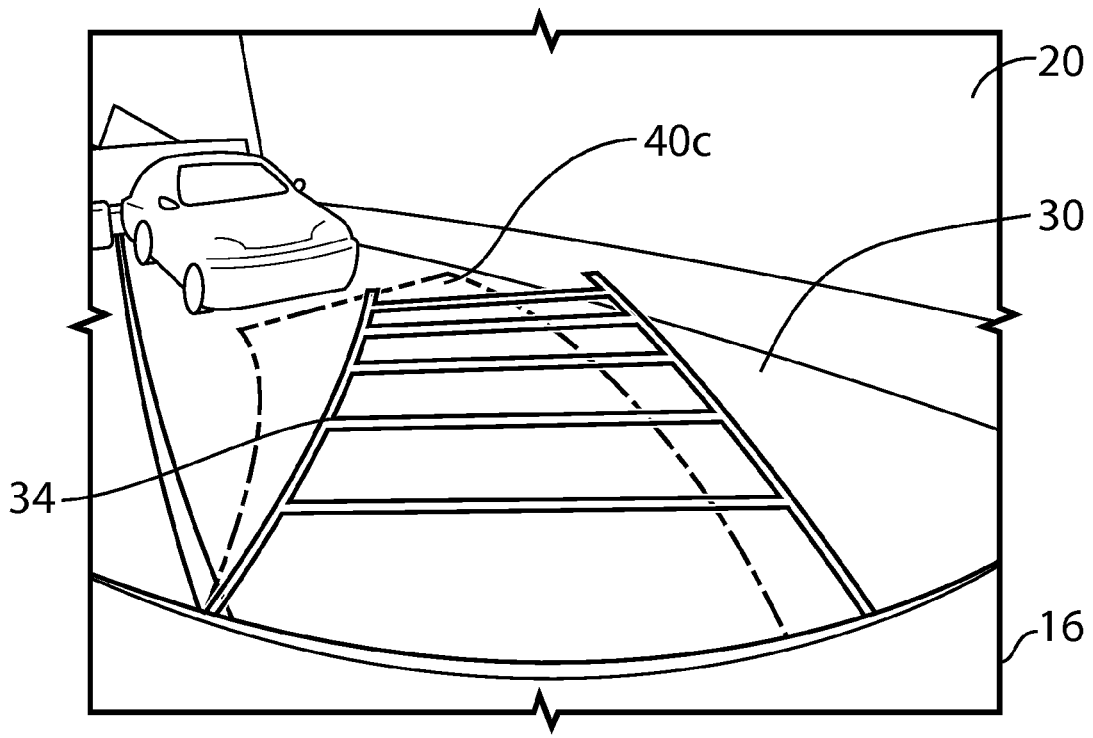
Figure 10D:
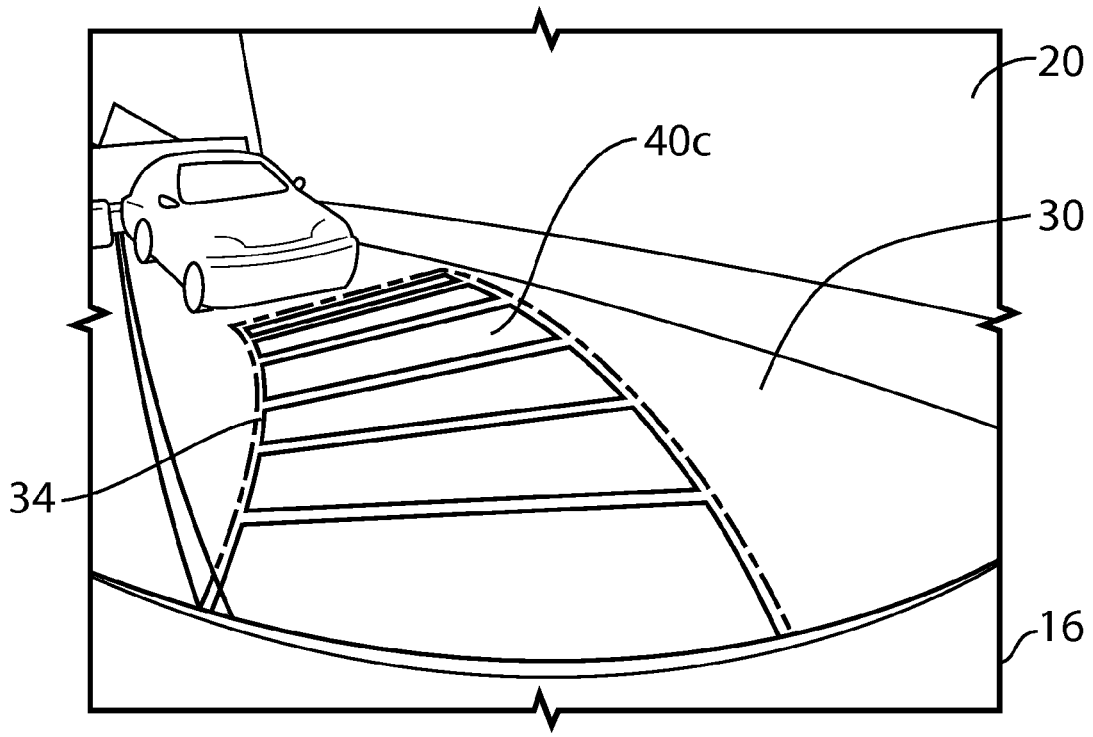

FIGS. 9a and 9b show the progress of the vehicle along the second target path segment. Once the vehicle has moved along the entire second target path segment, the parking assist system 10 selects the next (ie. third) target path segment for the vehicle to follow, which is represented in FIG. 10a at 40c. The third target path segment is the tuck-in phase of the parking maneuver and requires that the driver turn the steering wheel to the opposite limit. FIGS. 10a-10d illustrate the driver turning the wheel to bring the projected path into alignment with the third target path segment.

Figure 11:
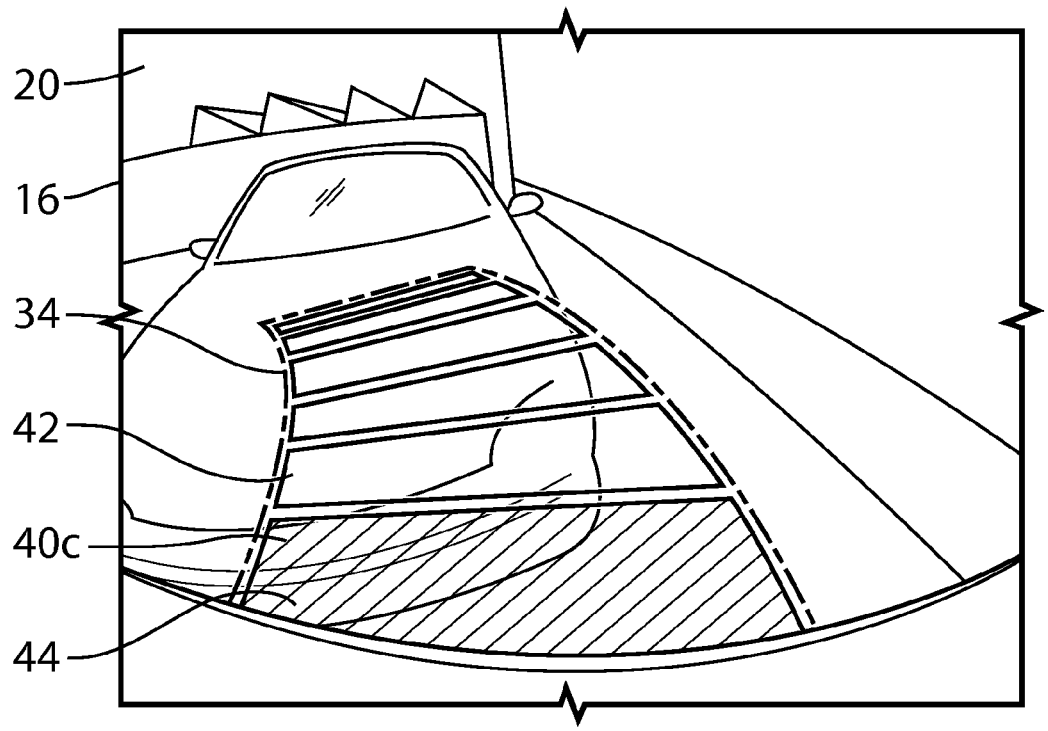
FIG. 11 is a view of an image of a field of view on the display shown in FIG. 3, with the parking assist system in the parking guidance mode, showing the vehicle having nearly completed the third target path segment for the vehicle.

Once the projected path and third target path segment are aligned, the driver backs the vehicle up along the third target path segment. FIG. 11 illustrates the vehicle having completed almost all of the third target path segment. After the third target path segment is completed, the driver has completed the entire parking maneuver. Optionally he/she can drive forward if desired to adjust the spacing between the driver's vehicle and the vehicles in front and behind.

It will be noted that the parking maneuver includes three phases, a backup phase wherein the vehicle is backed up in a straight line (with the wheels pointing straight), a turn-in phase wherein the vehicle is backed up at full wheel lock in one direction, and a tuck-in phase wherein the vehicle is backed up at full wheel lock in the other direction. Providing target path segments wherein the wheels are pointed straight or are at full lock simplifies the process of aligning the projected path with the target path segment, and simplifies keeping the vehicle along the target path segment.

While backing the vehicle up along a target path segment, if the driver for some reason veers off the target path by more than a selected amount, the parking assist system 10 notifies the driver, and optionally aborts the parking maneuver.

Optionally, the parking assist system 10 can permit the driver to select whether the parking spot is to the left of the vehicle (as shown in the figures) or to the right of the vehicle. For a parking spot on the right of the vehicle, the turn-in and tuck-in phases would be mirror images of the turn-in and tuck-in phases illustrated in FIGS. 8a-11.

It will be understood that the three target path segments need not all be the same length.

It will be noted that the rectangle 24 (FIG. 5) is at a fixed position behind and to the side of the vehicle. The target path for the parking maneuver is thus the same each time the vehicle is to be parked although it may be mirrored in the optional embodiment wherein the parking assist system 10 permits selecting a parking spot on the other side (ie. the right side) of the vehicle. As a result of the consistency in the parking maneuver, the parking maneuver need not be recalculated each time the vehicle uses the parking assist system 10. This permits the parking assist system 10 to operate using relatively inexpensive control hardware and software.

In the above description, the in-cabin display 16 was used as the human/machine interface and provided the driver with instructions visually/graphically for driving the vehicle into a parking spot. It is possible to provide instructions to the driver by other means in addition to or instead of using the in-cabin display 16. For example, the human/machine interface could include a speaker (eg. from the vehicle's sound system) and could emit audible messages to the driver via the speaker. Such messages could be instructions in any language, such as English. For example, an instruction could be given audibly to turn the vehicle steering wheel to a selected position (eg. full lock to the left). It will be noted that such an instruction would in effect inform the driver of the target path for the vehicle. In addition to the audible messages, or instead of them, a chime or a beep could be emitted at points in the parking process where the driver is supposed to carry out a new maneuver, to let the driver know that he/she is off course, to let the driver know that he/she is on course (ie. that the projected vehicle path matches the target path), or for any other suitable purpose.

Figure 12:
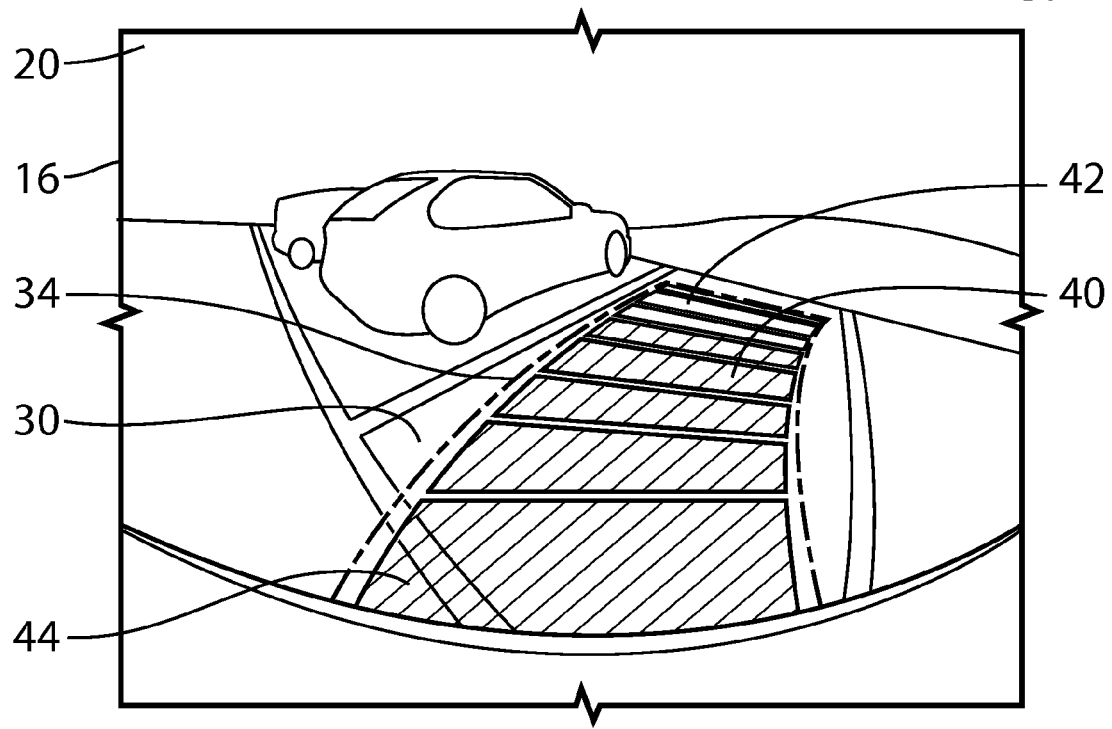
FIG. 12 is a view of an image of a field of view on the display shown in FIG. 3, with the parking system in the parking guidance mode, wherein the vehicle is parking in a perpendicular parking spot.

In the above description a method and system were described for parallel parking into a parking spot. It is also possible for an embodiment of the invention to be provided for parking into a perpendicular parking spot 30 (see FIG. 12). A perpendicular parking spot 30 is a parking spot that is perpendicular to the direction of travel of the vehicle when driving by. Perpendicular parking spots are typically used in parking lots for malls, office buildings and the like. In the position shown in FIG. 12, the vehicle has already completed some portion of the parking process and is backing into the parking spot 30.

While the above description constitutes a plurality of embodiments of the present invention, it will be appreciated that the present invention is susceptible to further modification and change without departing from the fair meaning of the accompanying claims.

The invention claimed is:

1. A parking assist system for a vehicle, the parking assist system comprising:
   a camera mounted to the vehicle so as to capture image data representative of a rearward scene in a field of view of the camera;
   a display in the vehicle operable to display an image of the rearward scene derived from captured image data;
   a controller operable in multiple modes;
   wherein the controller, when operating in a first mode of the multiple modes, is operable to add an overlay to the displayed image of the rearward scene, wherein the overlay includes a representation of a target parking position;
   wherein the controller is operable in the first mode while the vehicle is being driven by a driver of the vehicle;
   wherein, when the transmission of the vehicle is in a reverse gear, the controller is operable in a second mode, and wherein, when operating in the second mode, the controller adds a second overlay and a third overlay to the displayed image of the rearward scene;
   wherein the second overlay includes a representation of a projected rearward path of the vehicle that is based on a current vehicle steering angle of the vehicle; and
   wherein the controller is operable to determine a target path for the vehicle to guide the driver to the target parking position and wherein the third overlay includes a representation of the determined target path; and
   wherein the parking assist system is operable to display the determined target path for the vehicle and the projected rearward path of the vehicle, to inform the driver of the projected path for the vehicle based on the current vehicle steering angle, and to inform the driver of whether the projected rearward path substantially matches the determined target path.

2. A parking assist system as claimed in claim 1, wherein the representation has a length that represents generally the length of the vehicle.

3. A parking assist system as claimed in claim 2, wherein the representation has a width that represents generally the width of the vehicle.

4. A parking assist system as claimed in claim 1, wherein the overlay is a first overlay and wherein the controller is operable to operate the parking assist system in two operating modes which are selectable by a user, wherein in a first operating mode the controller is operable to add the first overlay to the image of the rearward scene, and wherein in a second operating mode the controller is operable to add a second overlay to the image of the rearward scene, wherein the second overlay includes a representation of a projected path for the vehicle based on a current vehicle steering angle, and a representation of a target path segment for the vehicle.

5. A parking assist system as claimed in claim 1, wherein the target parking position is parallel to a direction of travel of the vehicle.

6. A parking assist system as claimed in claim 1, wherein the target parking position is perpendicular to a direction of travel of the vehicle.

7. A parking assist system for a vehicle, the parking assist system comprising:
a camera mounted to the vehicle so as to capture image data representative of a rearward scene in a field of view of the camera;
a human/machine interface including a display operable to display an image of the rearward scene derived from captured image data; and
a controller operable in multiple modes;
wherein the controller, when operating in a first mode of the multiple modes, is operable to add an overlay to the displayed image of the rearward scene, wherein the overlay includes a representation of a target parking position;
wherein, when the transmission of the vehicle is in a reverse gear, the controller is operable in a second mode of the multiple modes, and wherein, when operating in the second mode, the controller is operable to determine a target path for the vehicle, to display for viewing by the driver an overlay of a projected path for the vehicle based on a current vehicle steering angle, and to display for viewing by the driver an overlay of the determined target path so as to inform the driver as to whether the projected path substantially matches the determined target path.

8. A parking assist system as claimed in claim 7, wherein when the vehicle is moving along the target path the overlay includes a representation of the progress of the vehicle on the target path.

9. A parking assist system as claimed in claim 7, wherein the representation of the projected path of the vehicle has a width that represents substantially the entire width of the vehicle.

10. A parking assist system as claimed in claim 7, wherein the controller informs the driver of the target path segments via a speaker.

11. A parking assist system as claimed in claim 10, wherein the controller informs the driver of the target path segments by instructing the driver to turn the steering wheel of the vehicle to a selected position.

12. A parking assist system as claimed in claim 7, wherein the controller informs the driver of whether the projected path substantially matches the target path via a speaker.

13. A parking assist system for assisting in the completion of a parking maneuver on a vehicle, the parking assist system comprising:
a camera mounted to the vehicle so as to capture image data representative of a rearward scene in a field of view of the camera;
a display in the vehicle operable to display an image of the rearward scene derived from captured image data; and
a controller operable in multiple modes;
wherein the controller, when operating in a first mode of the multiple modes, is operable to add an overlay to the displayed image of the rearward scene, wherein the overlay includes a representation of a target parking position;
wherein, when the transmission of the vehicle is in a reverse gear, the controller is operable in a second mode of the multiple modes, and wherein, when operating in the second mode, the controller is operable to determine a plurality of target path segments for the vehicle to follow, and wherein, when operating in the second mode, the controller is operable to display overlays of the determined target path segments on the displayed image of the rearward scene and to display an overlay of a projected rearward path of travel based on a current steering angle of the vehicle.

14. A parking assist system as claimed in claim 13, wherein the plurality of target path segments is three target path segments, including a first target path segment in which the vehicle is driven straight rearwardly, a second target path segment in which the vehicle is driven rearwardly with the steering wheels at full lock in one direction, and a third target path segment in which the vehicle is driven rearwardly with the steering wheels at full lock in the opposite direction.

15. A parking assist system as claimed in claim 14, wherein the length of each target path segment remains constant from one parking maneuver to another.

16. A parking assist system as claimed in claim 13, wherein the controller informs the driver of the target path segments via the display.

17. A parking assist system as claimed in claim 13, wherein the controller informs the driver of the target path segments via a speaker.

18. A parking assist system as claimed in claim 13, wherein, when the vehicle is reversing, the overlay includes a representation of the progress of the vehicle along the determined target path.

19. A parking assist system as claimed in claim 13, wherein the representation of the projected rearward path of travel has a width that represents substantially the entire width of the vehicle.

* * * * *

UNITED STATES PATENT AND TRADEMARK OFFICE
CERTIFICATE OF CORRECTION

| | | |
|---|---|---|
| PATENT NO. | : 8,874,317 B2 | Page 1 of 1 |
| APPLICATION NO. | : 13/384672 | |
| DATED | : October 28, 2014 | |
| INVENTOR(S) | : Hagen Marczok, Holger Goerg and Paolo Di Alberto | |

It is certified that error appears in the above-identified patent and that said Letters Patent is hereby corrected as shown below:

Claims

<u>Column 7</u>
Lines 7-17, Claim 4, delete
Claim 4 was canceled

Signed and Sealed this
Twenty-seventh Day of October, 2015

Michelle K. Lee
*Director of the United States Patent and Trademark Office*